US012272270B2

(12) United States Patent
Verret

(10) Patent No.: US 12,272,270 B2
(45) Date of Patent: Apr. 8, 2025

(54) ONE-PIECE REVERSIBLE FLEX HOLDER WITH CALIBRATED RETENTION, FOR FLEXIBLE FACE SIGNS AND TARP BUILDINGS

(71) Applicant: Normand Verret, Edmundston (CA)

(72) Inventor: Normand Verret, Edmundston (CA)

(73) Assignee: GESTION VERRET, INC, Edmundston (CA)

( * ) Notice: Subject to any disclaimer, the term of this patent is extended or adjusted under 35 U.S.C. 154(b) by 215 days.

(21) Appl. No.: 18/445,003

(22) Filed: Mar. 1, 2023

(65) Prior Publication Data

US 2024/0021110 A1 Jan. 18, 2024

Related U.S. Application Data

(60) Provisional application No. 63/372,382, filed on Mar. 9, 2022.

(51) Int. Cl.
*G09F 7/18* (2006.01)

(52) U.S. Cl.
CPC ........ *G09F 7/18* (2013.01); *G09F 2007/1847* (2013.01)

(58) Field of Classification Search
CPC .......... G09F 15/0012; G09F 1/12; G09F 7/18; G09F 2007/1847; G09F 15/0018; G09F 15/0025; Y10T 24/44043; Y10T 24/51; Y10T 24/44051; Y10T 24/4406; Y10T 403/60
USPC ................ 24/460–462, 593.1; 160/371, 378; 38/102.91
See application file for complete search history.

(56) References Cited

U.S. PATENT DOCUMENTS

| | | | |
|---|---|---|---|
| 3,792,678 A | 2/1974 | Rowland | |
| 4,503,631 A | 3/1985 | Kelly | |
| 4,910,898 A | 3/1990 | Hector | |
| 5,255,459 A | 10/1993 | Verret | |
| 5,669,166 A | 9/1997 | Verret | |
| 5,791,034 A | 7/1998 | Verret | |
| 6,056,471 A | 5/2000 | Dinitz | |
| 6,061,941 A * | 5/2000 | Verret | G09F 15/0025 160/371 |
| 6,070,351 A | 6/2000 | Verret | |

(Continued)

FOREIGN PATENT DOCUMENTS

| | | |
|---|---|---|
| CA | 1217635 | 2/1987 |
| CA | 2291529 | 6/2006 |

(Continued)

*Primary Examiner* — Cassandra Davis
(74) *Attorney, Agent, or Firm* — Mario Theriault

(57) ABSTRACT

The one-piece reversible flex holder is affixed to the edge of a flexible face material by a latch, and retains the flexible face material to a sign frame. The latch is selectively openable to release the flexible face material upon a predetermined tension being applied to the flexible face material. A hinge on the latch blade has a S-shape and a bendable segment capable of deformation under a determined load. An excessive force on the flexible face material such as a strong gust of wind causes the hinge to collapse on itself, thereby releasing the latch blade from the latch block, and letting the flex face material slip out of the flex holder. Excessive wind forces causes the face of the sign to open, to let wind pass through the sign face to release stresses on the sign structure.

6 Claims, 3 Drawing Sheets

(56) References Cited

U.S. PATENT DOCUMENTS

| | | | |
|---|---|---|---|
| 6,073,376 | A | 6/2000 | Verret |
| 6,637,080 | B2 | 10/2003 | Verret |
| 6,758,002 | B1 | 7/2004 | Duguay |
| 8,595,966 | B2 | 12/2013 | Breihof |
| 8,997,648 | B1 | 4/2015 | Niswonger |
| 9,284,770 | B2 | 3/2016 | Sprague |
| 2003/0005559 | A1 * | 1/2003 | Verret ................. G09F 15/0012 24/462 |
| 2006/0024131 | A1 | 2/2006 | Wiegand et al. |
| 2012/0186118 | A1 | 7/2012 | Nabors, Jr. |
| 2012/0328435 | A1 | 12/2012 | Crocker et al. |
| 2014/0311049 | A1 | 10/2014 | Siegmund |

FOREIGN PATENT DOCUMENTS

| | | |
|---|---|---|
| CN | 109826123 | 5/2019 |
| CN | 209183124 | 7/2019 |
| CN | 209248944 | 8/2019 |
| CN | 109461370 | 12/2019 |
| CN | 210722338 | 6/2020 |
| CN | 113585119 | 2/2021 |
| CN | 213635285 | 6/2021 |
| CN | 216053607 | 3/2022 |
| CN | 217174467 | 8/2022 |
| GB | 239938 | 9/1925 |
| JP | 2009052242 | 12/2009 |
| KR | 1020030036529 | 9/2003 |
| KR | 100926257 | 4/2009 |
| KR | 20090076134 | 7/2009 |
| KR | 101344510 | 12/2013 |
| KR | 101900443 | 9/2018 |

* cited by examiner

ONE-PIECE REVERSIBLE FLEX HOLDER WITH CALIBRATED RETENTION, FOR FLEXIBLE FACE SIGNS AND TARP BUILDINGS

The present application claims the benefit of U.S. Provisional Application No. 63/372,382, filed Mar. 9, 2022.

FIELD OF THE INVENTION

The present flex holder pertains to the sign industry, and more particularly it pertains to a retainer with a calibrated retention for retaining a flexible face material to a sign frame in such a way as to release the face material during a catastrophic weather event, and protect the structure of the sign from damage.

BACKGROUND

The flexible face sign of interest herein has its face material stretched across the opening in a sign frame and is anchored to the periphery of the sign's opening. Holding devices are attached at intervals along the flexible sign face and are made to engage into a slot along the sign frame to retain the face material to the sign casing. The holding devices and the slot are covered with a cap or a moulding that enhances the general appearance of the sign. These holding devices are referred to in the industry as flex holders.

Examples of flex holders of the prior art are disclosed in several U.S. Patents granted to Normand Verret, the inventor of the present invention. These U.S. Patents are:

U.S. Pat. No. 5,255,459 issued on Oct. 26, 1993;
U.S. Pat. No. 5,669,166 issued on Sep. 23, 1997;
U.S. Pat. No. 5,791,034 issued on Aug. 11, 1998;
U.S. Pat. No. 6,061,941 issued on May 16, 2000;
U.S. Pat. No. 6,070,351 issued on Jun. 6, 2000;
U.S. Pat. No. 6,073,376 issued on Jun. 13, 2000, and
U.S. Pat. No. 6,637,080 issued on Oct. 28, 2003.

The one-piece reversible flex holder described in the latest of the above documents; U.S. Pat. No. 6,637,080, has enjoyed a great commercial success over the last 20 years. This flex holder remains a big seller to this day. This reversible flex holder is the subject of the present improvement invention.

Although the flex holder described in U.S. Pat. No. 6,637,080 is mentioned herein as a precursor to the present invention, other analogous applications are now being considered. These analogous applications comprise tarp buildings and tarp structures such as portable garages, greenhouses, horse arenas, hay storage barns as well as awnings, shades, and the like. Therefore, the flex holder as used in the sign industry should not be considered as a limitation to the present invention. The sign industry is used herein for convenience to explain the importance of the present invention in limiting wind-induced damages.

Extreme weather events are becoming more frequent around the world due to climate changes. Hurricanes and tornadoes are more common in all regions. Signs exposing large surfaces are more than ever susceptible of structural damages.

One example of such damage took place along a Trans-Canada highway, near Bertierville, Québec, Canada. The sign had a surface of 20 feet high by 40 feet wide, and was mounted at a height of 100 feet. The sign was supported by two I-beams, each having a depth of 36 inches, a flange width of 16 inches and a thickness of ¾ inch. During an unexpected strong wind, which was later classified as "an isolated extreme wind gust", the sign was blown down. The two large I-beams were twisted and bent to the ground, without damaging the flexible face material or the sign box.

This demonstrates that the present-day design of sign structures needs to be revised in view of new extreme weather conditions. The one-in-thirty-years weather events that were considered in the past may no longer apply, and therefore, engineering practices and construction methods need to be revised to take into account these climate changes.

Wind damages to sign structures have been a concern for sign builders for a long time, and all over the world. Examples of solutions found in the prior art include the following inventions.

Sacrificial Base,
- U.S. Pat. No. 6,056,471 issued to Arthur Dinitz on May 2, 2000;
- US 2006/0024131 published by Kenneth E. Wiegand et al. on Feb. 2, 2006;

Weak Link Seams,
- US 2012/0328435 publ. by Timothy R. Crocker et al. on Dec. 27, 2012;
- US 2014/0311049 published by Stefan Siegmund on Oct. 23, 2014;

Spring-Loaded Pendulum
- GB 239,938 issued to Gordon London Woop on Sep. 21, 1925;
- U.S. Pat. No. 4,503,631 issued to Gerard T. Kelly on Mar. 12, 1985;

Spring Loaded Against the Wind.
- U.S. Pat. No. 3,792,678 issued to William P. Rowland on Feb. 19, 1974;
- JP 2009052242 published by Usui Kenji on Mar. 12, 2009;

Weather Vane Style:
- KR 100926257 issued to Song Hyung Ryul on Apr. 11, 2009;
- US 2012/0186118 published by R. L. Nabors, Jr. on Jul. 26, 2012.
- KR 101900443 issued to Lee Jin Young on Sep. 19, 2018.

Telescopically Collapsing:
- CN 209248944 issued to Chu Zhengchao et al. On Aug. 13, 2019;
- CN 2107/22338 published by Yang Chao on Sep. 6, 2020;
- CN 213635285 published by Cheng Hui on Jun. 7, 2021.

Louvers Style:
- U.S. Pat. No. 4,910,898 issued to Francis N. Hector on Mar. 27, 1990;
- KR 1020030036529 issued to Joong Suk Park on Apr. 14, 2005;
- KR 101344510 issued to Cheong Cheol and Dec. 17, 2013;
- CN 109461370 issued to Zan Hongquan on Sep. 9, 2020;
- CN 109826123 issued to Yang Shaohuai et al., on Apr. 27, 2021.
- CN 216053607 published by Zhang Yilei on Mar. 15, 2022;
- CN 217174467 published by Ye Jiwen et al. on Dec. 8, 2022;

Perforated Sign Faces:
- KR 20090076134 issued to Lim Jung Youl, on Jul. 13, 2009;
- CN 209183124 published by Li Guang on Jul. 30, 2019;
- CN 113585119 published by Feng Pan et al., on Feb. 11, 2021.

As can be appreciated from the above list of proposed solutions that wind damage has perhaps been an international issue since the first use of stand-alone commercial signs. Although the prior art offers many solutions to prevent or limit wind damage to a sign, none of these solutions is applicable to modern wide face sign made of flexible face material.

The present inventor's flex holder as described in U.S. Pat. No. 6,637,080 has been licensed in several different countries. As a result, most wide-face signs used today in Europe and America, are made of flexible face material held to a rectangular frame by such flex holders, and the solutions described in the prior art do not apply to these flexible face signs.

Therefore, it is believed that the sign industry needs new flex holders capable of retaining the flexible face material in such a way as to allow the face material to slip out of the flex holders and release the wind pressure on the sign structure, as illustrated in FIGS. 1 & 2 in the attached drawings. Opening a portion of the sign face as illustrated, has the effect of releasing the wind pressure and the stress on the supporting structure of the sign.

After a major wind storm, the signs that are released-opened could be repaired by simply reinstalling new flex holders on the same flexible face and re-tightening the flexible face to the frame.

SUMMARY OF THE INVENTION

In the present invention, there is provided a one-piece reversible flex holder with a calibrated retention latch mounted therein. In one aspect of the present invention, there is provided a combination of a one-piece reversible flex holder, a flexible face material and a sign frame. The one-piece reversible flex holder is affixed to the flexible face material by a latch, and retains the flexible face material to the sign frame. The latch is selectively openable to release the flexible face material upon a pre-determined tension being applied to the flexible face material.

This new flex holder is also referred to herein as the "new flex holder" or "calibrated flex holder", for convenience. The new flex holder is made of malleable material, such as aluminium for example. The new flex holder has a latch blade that is hinged to a latch block. The latch blade is configured to bend over a flexible face material and to engage with the latch block, for retaining the flexible material between the latch blade and the latch block. The new flex holder also has teeth to engage inside the slot of an extruded moulding along the perimeter of the sign.

The hinge on the latch blade has a S-shape segment capable of deformation under a determined load. An excessive force on the flexible face material such as a strong gust of wind causes the S-shape segment to collapse on itself, thereby releasing the latch blade from the latch block, and letting the flex face material slip out of the new flex holder. Excessive wind forces causes the face of the sign to open, to let the wind pass through the sign face to release stresses on the sign structure.

In another aspect of the present invention, the new flex holder with a calibrated retention, retains its reversibility features as described in U.S. Pat. No. 6,637,080. The new flex holder can be mounted one way with the calibrated retention feature active or another way with the calibrated retention feature inactive, as will be explained later.

Still another feature of the calibrated flex holder is that this new flex holder is a modified version of the flex holder patented in U.S. Pat. No. 6,637,080, and the modification is minimal. For that reason, the new flex holder is susceptible of a low cost of manufacture with regards to both materials and labour, and which accordingly is then susceptible of low prices of sale to the public.

BRIEF DESCRIPTION OF THE DRAWINGS

Drawings of the new reversible flex holder with calibrated retention according to the preferred embodiments are provided in which.

DESCRIPTION OF THE PREFERRED EMBODIMENT

Referring simultaneously to FIGS. 1 to 11, the new flex holder with its features and advantages will be explained while referring to one or several drawings at the time.

Figure 3:
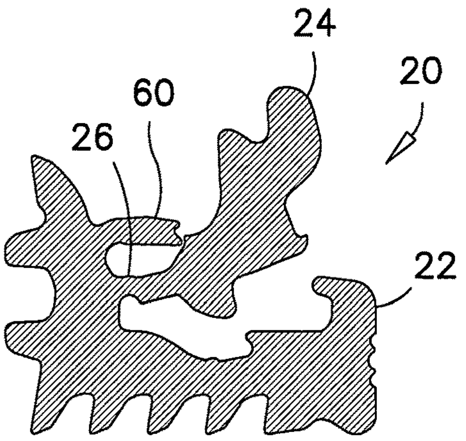
FIG. 3 (PRIOR ART)
FIG. 3 shows, for reference, a cross section of a first reversible flex holder patented in U.S. Pat. No. 6,637,080.

Referring firstly to FIG. 3, a cross-section view of the one-piece reversible flex holder 20 described in U.S. Pat. No. 6,637,080 is illustrated. This flex holder 20 comprises a latch block 22, and a latch blade 24 hinged to the latch block 22 by a hinge 26.

Figure 4:
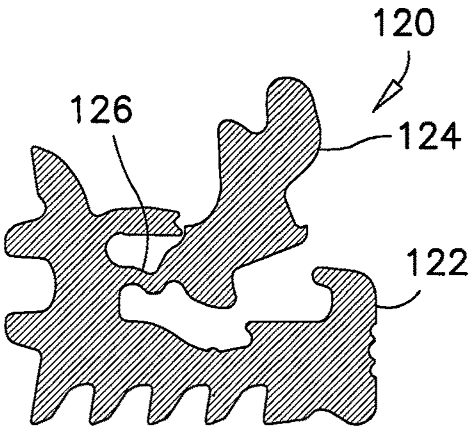
FIG. 4 illustrates a cross-section of the new one-piece calibrated reversible flex holder with the S-shape hinge and with the latch blade in the open position.
Figure 6:
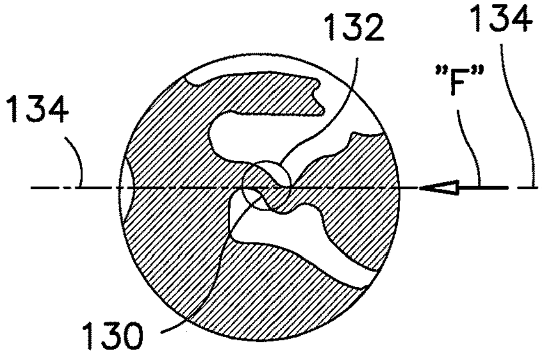
FIG. 6 is an enlarged view of the compressible hinge as shown in detail circle 6 in FIG. 5.
Figure 5:
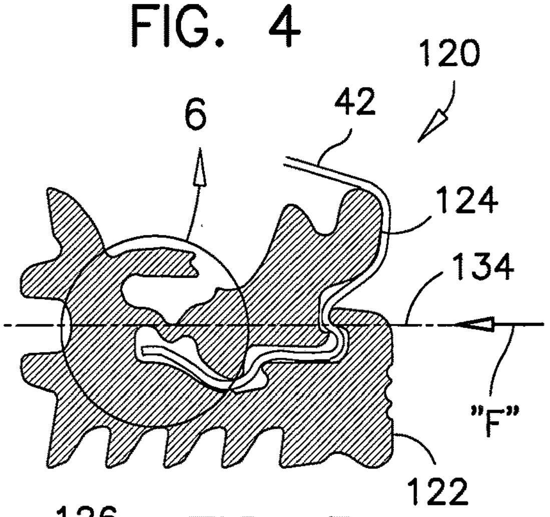
FIG. 5 illustrates a cross-section of the new one-piece calibrated, reversible flex holder with the latch blade in the closed position.
Figure 9:
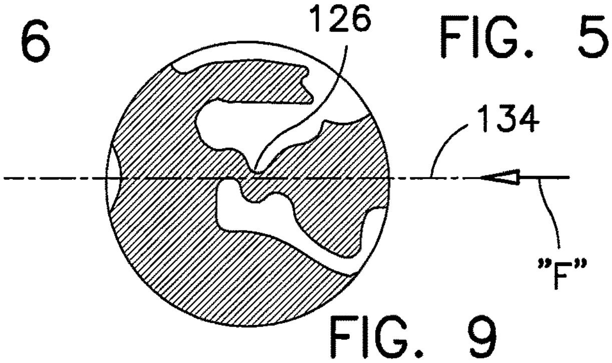
FIG. 9 is an enlarged view of the S-shape hinge in the deformed mode as seen in detail circle 9 in FIG. 8.

The new flex holder 120 as shown in FIG. 4 is identical to the reversible flex holder 20, except for the hinge 126 on the latch blade. The hinge 126 in the new flex holder 120 has a S-shape, as opposed to a U-shape in the original flex holder 20. Because of the S-shape, the hinge 126 is compressible.

The new flex holder 120 is made of a malleable material having a certain elasticity such as aluminium. The desired degree of elasticity can be expressed as the hinge 126 being capable of bending about the bending axis thereof without reaching the tensile strength of the material. Similarly, the hinge 126 is capable of compression and deformation in a direction perpendicular to the bending axis thereof without reaching the tensile strength of the material.

Figure 2:
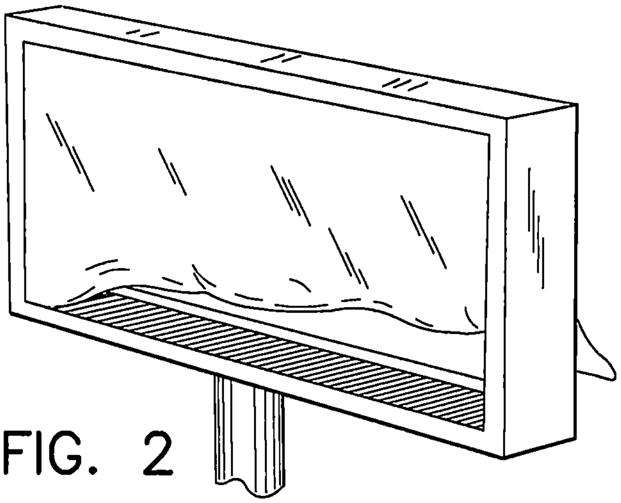
FIG. 2 illustrates a back face of the sign having the new calibrated flex holders installed therein and wherein the face of the sign has been blown open by excessive wind forces.
Figure 1:
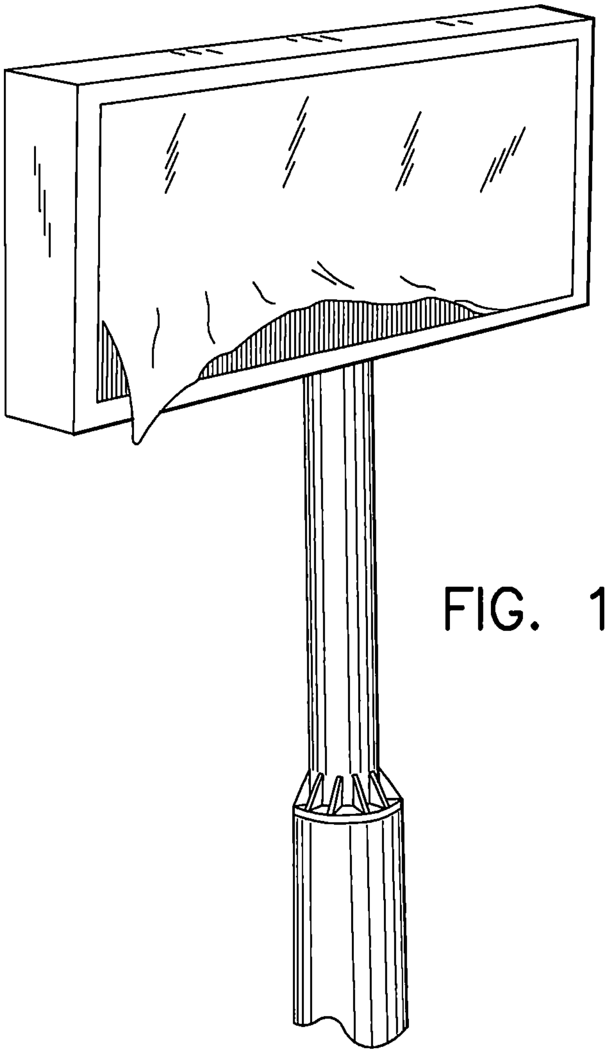
FIG. 1 illustrates a front face of a common sign having the new calibrated flex holders installed therein, and wherein the face of the sign has been blown open by excessive wind forces.
Figure 8:
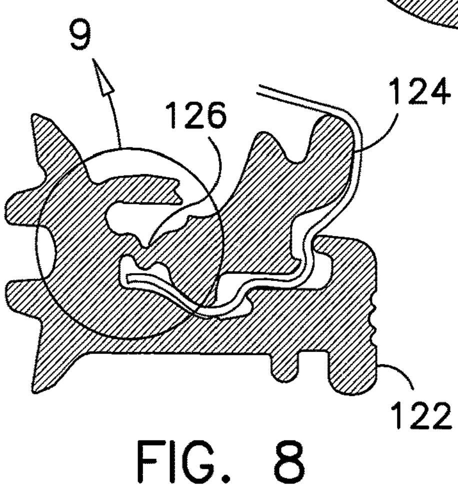
FIG. 8 illustrates a cross section of the new reversible flex holder mounted in an active mode and with the S-shape hinge in a deformed mode and the latch blade ready to open.

The new S-shape hinge 126 has a bendable segment 130 along its bending axis 132, The bendable segment 130 is subject to more bending than compression, as both ends of this segment 130 touches the plane 134 of the latch blade 124. The bendable segment 130 is subjected to bending stresses when a force "F" is applied along a plane 134 of latch blade 124. This bendable segment 130 forms a diagonal of the S-shape hinge 126. This bendable segment 130 also forms a diagonal along the plane 134 of the latch blade, and it is deformable from this diagonal position toward a perpendicular alignment relative to the plane of the latch blade 124. This bendable segment 130 is calibrated to compress or deform when a one-in-thirty-years wind storm occurs, or to compress or deform under a loading according to a designer's choice. A deformation of the hinge 126 causes the latch blade 124 to disengage from the latch block 122 as shown in FIG. 8, to release the flexible material of the sign face, and to open the sign face as shown in FIGS. 1 & 2.

It will be appreciated that the thickness as well as the tensile strength of the material of the bendable segment 130, can be selected to calibrate the force "F" that is require to deform the segment 130 and open the flex holder 120. Preferable the calibration is effected between the yield strength and the tensile strength of the material used.

Referring now to FIGS. 5, 6, 8 and 9, it will be appreciated that the tension "F" in the flexible face material 42 is transmitted directly along the plane 134 of the latch blade 124, perpendicular to the bending axis 132 of the hinge 126. This force "F" is transmitted to the bendable segment 130 as compressive and bending stresses. This force "F" on the bendable segment 130 is present when the new flex holder 120 is mounted as illustrated in FIGS. 5, 8, 9 and 10.

Figure 7:
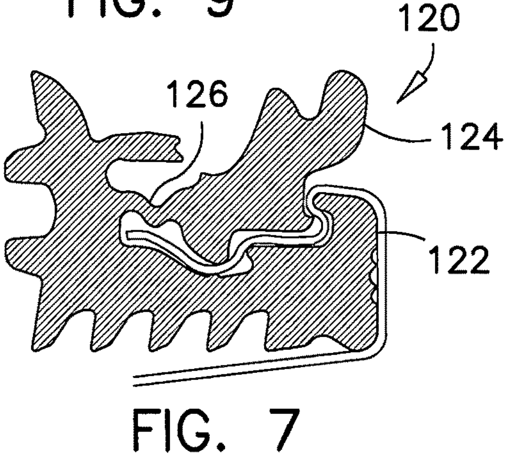
FIG. 7 illustrates a cross-section of the new one-piece calibrated reversible flex holder mounted in a backward position with the calibrated retention feature inactive.
Figure 11:
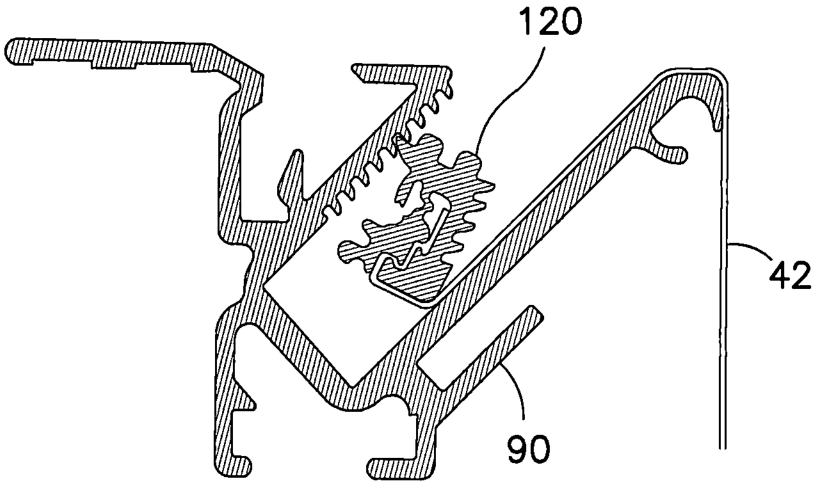
FIG. 11 illustrates the calibrated flex holder mounted inside a common framing extrusion, with the calibrated retention inactive.

When the new flex holder 120 is mounted in the reverse mode, as illustrated in FIGS. 7 and 11, the calibrated feature is inactive as the tension in the flexible face material is no longer applied to the new S-shape hinge 126.

It will be appreciated that the calibrated flex holder 120 retains all the features in the flex holder 20 described in U.S. Pat. No. 6,637,080, and offers the option of using the calibrated-retention feature or not.

Figure 10:
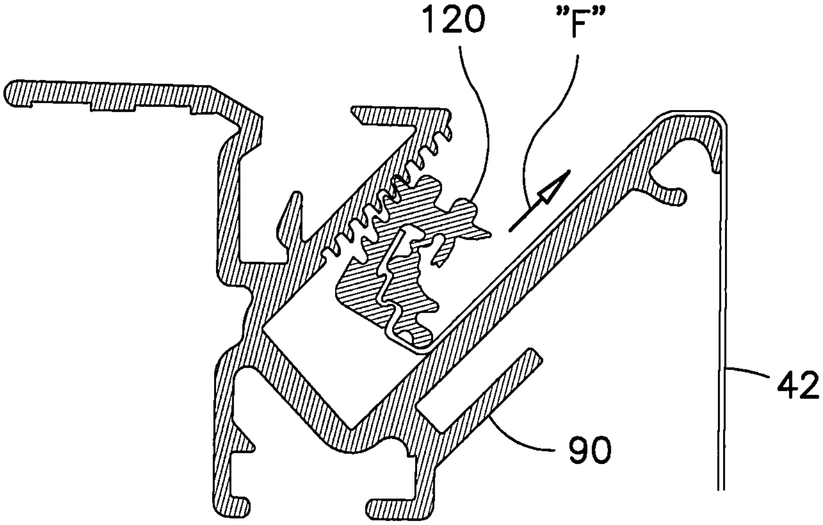
FIG. 10 illustrates the calibrated flex holder mounted inside a common framing extrusion, with the calibrated retention active.

Referring to FIGS. 1 and 2 and FIGS. 10 and 11, one-piece reversible flex holders 120 are preferably mounted, in equally spaced-apart mode around the sign. Preferably, the reversible flex holders 120 in the lower portion of the sign, as illustrated in FIG. 10, have the calibrated retention active, and can be used the other way as in FIG. 11 along the upper portion of the sign. A sign that has been blown opened during a storm is thereby easier to repair after the storm.

What is claimed is:

1. A one-piece reversible flex holder for retaining a flexible face material to sign frames and tarp buildings, comprising: a latch block;

a latch blade mounted to said latch block by a hinge;

said latch blade being configured to bend about said hinge over said flexible face material and to engage said latch blade to said latch block for retaining said flexible material between said latch blade and said latch block; said hinge being mounted along a plane of said latch blade; said hinge having a bendable segment therein and said bendable segment being calibrated to deform under a pre-determined loading in said flexible face material along said plane of said latch blade, for releasing an engagement of the latch blade and said latch block, and releasing said flexible face material therefrom;

said hinge comprising a S-shape and said bendable segment being part of said S-shape and forming a diagonal of said S-shape, relative to said plane of said latch blade and wherein said bendable segment is bendable toward a perpendicular position alignment relative to said plane of said latch blade.

2. The one-piece reversible flex holder as claimed in claim 1, wherein said bendable segment is made of malleable material, and has a calibration that is relative to a thickness thereof and a tensile strength of said malleable material.

3. The one-piece reversible flex holder as claimed in claim 2, wherein said malleable material is aluminium.

4. The one-piece reversible flex holder as claimed in claim 2, wherein said calibration corresponds to a strength of said malleable material between a yield strength and a-tensile said tensile strength of said malleable material.

5. The one-piece reversible flex holder as claimed in claim 1 wherein said S-shape hinge being configured to deform and displace said latch blade along said plane of said latch blade relative to said latch block, and to disengage said engagement of said latch blade to said latch block.

6. The one-piece reversible flex holder as claimed in claim 1, wherein said flexible face material is a tarp.

* * * * *